United States Patent [19]

Tajima

[11] Patent Number: 5,157,487
[45] Date of Patent: Oct. 20, 1992

[54] DISTANCE INFORMATION OBTAINING DEVICE
[75] Inventor: Joji Tajima, Tokyo, Japan
[73] Assignee: NEC Corporation, Tokyo, Japan
[21] Appl. No.: 705,058
[22] Filed: May 23, 1991
[30] Foreign Application Priority Data May 23, 1990 [JP] Japan .................. 2-133109

[51] Int. Cl.$^5$ .............................. H04N 7/18
[52] U.S. Cl. ........................ 358/107; 356/4; 364/561
[58] Field of Search .......... 358/107; 356/4; 364/561

[56] References Cited

U.S. PATENT DOCUMENTS

| 4,310,227 | 1/1982 | Zinchuk | 354/25 |
| 4,522,492 | 6/1985 | Masunaga | 356/1 |
| 4,746,790 | 5/1988 | Sorimachi | 250/201 |
| 4,761,546 | 8/1988 | Ukari et al. | 250/201 |
| 4,786,815 | 11/1988 | Walker et al. | 250/500 |
| 4,864,395 | 9/1989 | Tajima | 358/107 |

FOREIGN PATENT DOCUMENTS 0280110 2/1988 European Pat. Off. .
0302512 8/1988 European Pat. Off. .
6175210 9/1984 Japan .
WO88/05525 1/1987 World Int. Prop. O. .

OTHER PUBLICATIONS

IEEE Int. Conference on Robotics and Automation 24–29, Apr. 1988, pp. 1702–1708.

Primary Examiner—John K. Peng
Attorney, Agent, or Firm—Foley & Lardner

[57] ABSTRACT

A distance information obtaining device which uses an image pickup device, to pick up an optical image of an object and produce a picture signal, and a signal processor which process the signal picture and calculates therefrom the distance between the object and the pickup device. A corrective filter is located along the optical path, which includes both an illuminating beam and a beam reflected off of the object, in order to correct the spectral characteristics of the light beam, the sensors located in the image pickup device and the color of the object. The corrective filters can be placed in various positions along the path. A method is provided to interchange various corrective filters according to the characteristics of the object.

11 Claims, 11 Drawing Sheets

DISTANCE INFORMATION OBTAINING DEVICE

BACKGROUND OF THE INVENTION

The present invention relates to a distance information obtaining device for determining a distance between a camera or similar image pickup device and an object for each pixel of the image pickup device.

A range finder capable of determining a distance between an image pickup device such as a television (TV) camera and an object on a pixel basis is disclosed in U.S. Pat. No. 4,864,395 issued to the same inventor as the present invention.

In the range finder taught in the above U.S. Patent, a diffraction grating diffracts a white light beam for illumination in a spectral distribution which ranges from red to bluish purple (or violet) and then projects the resulted illuminating beam onto an object. A component of the illuminating beam having a wavelength $\lambda$ is incident to a point P (located at an angular distance $\beta$ from the Z axis) on the surface of an object forming an angle $\theta$ with the normal of the grating (i.e., angle $\alpha$ as measured from the Z axis). A reflected light beam reflected from the object is propagated through a lens built in the camera to reach a half-mirror. The half-mirror splits the reflected light beam into two beams and causes each of them to follow a different optical path. Each of the two beams is incident to one of two sensors each having a particular spectral sensitivity and sensed at a position on the sensor. The outputs of the sensors each representative of an optical image of the object are fed to a processing unit to produce distance information.

The processing unit calculates the coordinates of the point P by using the coordinates of the center of the grating and the above-mentioned angles $\alpha$ and $\beta$. The angle $\beta$ is obtained on the basis of the position of the optical image reflected from the point P on the sensor. To determine the angle $\alpha$, the processing unit determines the wavelength $\lambda$ of the light beam incident to and reflected from the point P and then the angle $\theta$ between the light beam of the wavelength $\lambda$ and the normal of the grating. Further, the wavelength $\lambda$ can be calculated on the basis of the ratio R between the outputs of the pixels of the two sensors to which the reflected light beam from the point P is incident. To determine the ratio R accurately, it is necessary for the sum of the outputs of the two sensors to be sufficiently great.

The conventional range finder stated above uses two sensors each having a particular spectral sensitivity, and illuminates each point of the object with the light beam having various wavelength components. The problem is, therefore, that the outputs of both sensors may be lowered and, therefore, the accuracy of the ratio R between the outputs is degraded, depending on the wavelength of the reflected beam, i.e., the point of the object to be measured.

Such a problem is also derived from the difference in the color of an object. Specifically, since the spectral intensity of the reflected light beam is modulated by the reflectance of the object, the ratio R, which is obtained by the reflected beam at a point illuminated by a component of the beam having a wavelength of low reflectance, is not accurate, degrading the accuracy of measurement.

SUMMARY OF THE INVENTION

It is therefore an object of the present invention to provide a distance information obtaining device which reduces the irregularities in the accuracy of measurement ascribable to the position of an object.

It is another object of the present invention to provide a distance information obtaining device which reduces the irregularities in the accuracy of measurement ascribable to the color of an object.

It is another object of the present invention to provide a distance information obtaining device which enhances accurate measurement with a simple construction.

A distance information obtaining device of the present invention comprises a spectral pattern projecting device for producing, from a light beam issuing from a light source, an illuminating beam having a plurality of wavelength components and for projecting the illuminating beam onto an object; an image pickup device for picking up a reflected beam reflected from the object by a plurality of sensor units each having a effective spectral sensitivity; a correcting filter located on an optical path including the illuminating beam and the reflected beam for correcting the spectral characteristic of the light source and the spectral characteristics of the sensor units; and a processing unit for executing arithmetic operations with a plurality of pictures produced by the plurality of the sensor units of the image pickup device to determine a distance from the image pickup device to the object for each pixel of the pictures.

BRIEF DESCRIPTION OF THE DRAWINGS

The above and other objects, features and advantages of the present invention will become more apparent from the following detailed description taken with the accompanying drawings in which.

DETAILED DESCRIPTION OF THE PREFERRED EMBODIMENTS

Figure 1:
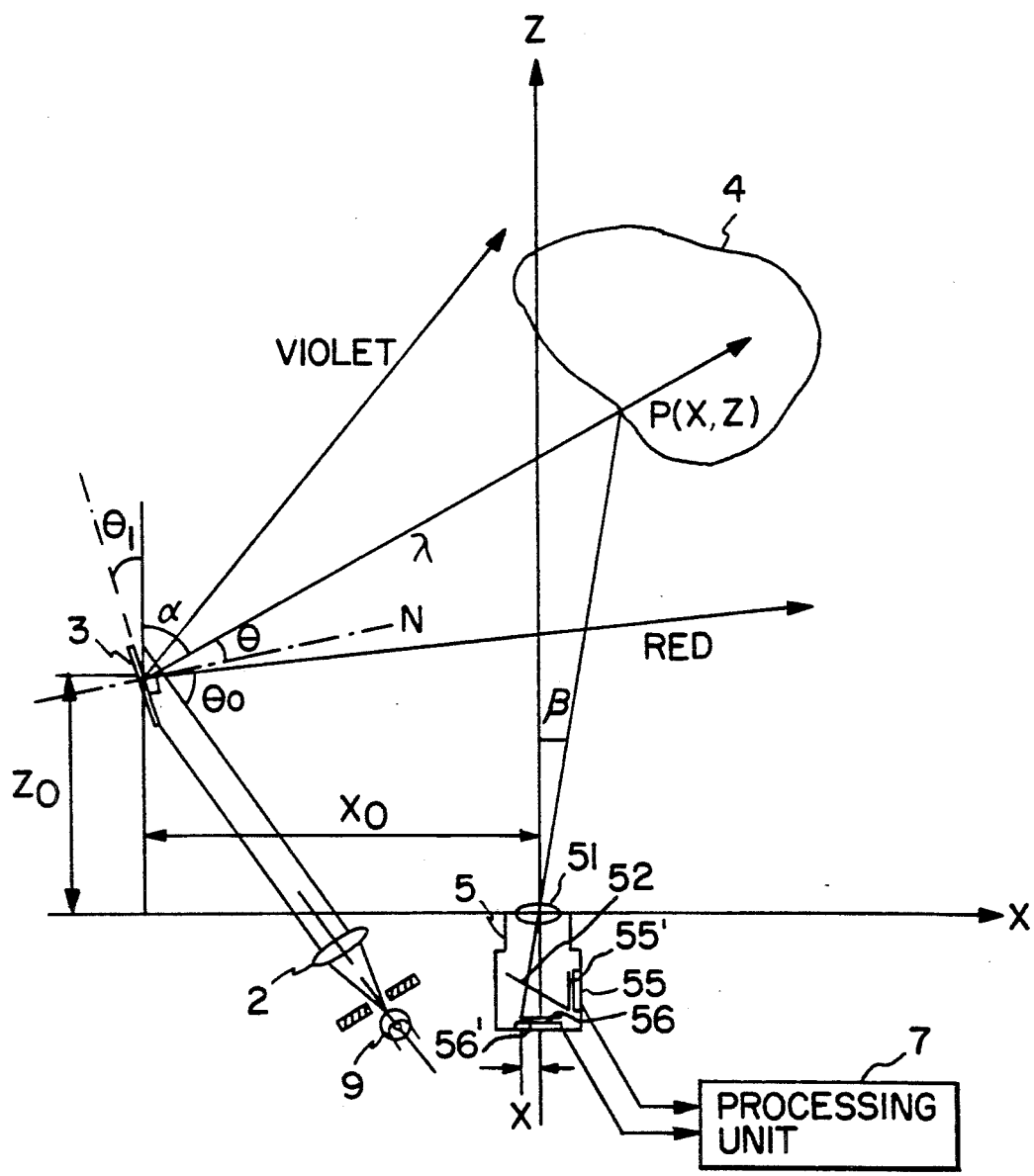
FIG. 1 shows a conventional range finder.

To better understand the present invention, a brief reference will be made to a range finder described in U.S. Pat. No. 4,864,395, shown in FIG. 1. As shown, the range finder has a white light source 9 and a diffraction grating 3. A light beam issuing from the white light source 9 is incident to the diffraction grating 3 via a lens 2. The diffraction grating 3 directs diffracted light beams, as an illuminating beam, toward an object 4 in a spectral distribution ranging from red to bluish purple (or violet) so that the illuminating beam has a plurality of wavelength components. As a result, a wavelength component of the beam having a wavelength $\lambda$ is projected onto a specific point P (located at an angular distance $\beta$ from the Z axis) on the surface of the object 4 forming a beam angle $\theta$ with the normal N of the grating 3 (i.e., an angle $\alpha$ as measured from the Z axis). The beam reflected from the specific point P is propagated through a lens 51 built in a camera 5 and then split by a half-mirror 52 to follow two different optical paths. The two split beams are respectively incident to CCD (Charge Coupled Device) image sensors 55 and 56 having a particular intrinsic spectral sensitivity, and each is sensed at the sensor position x. The outputs of the sensors 55 and 56 representative of an image are fed to a processing unit 7 which then produces distance information.

The coordinates (X, Z) of the specific point P are expressed as:

$$Z = \frac{X_0 - Z_0 \tan\alpha}{\tan\beta - \tan\alpha}, X = Z\tan\alpha \quad (1)$$

where $X_0$ and $Z_0$ are respectively the X coordinate and the Z coordinate of the center of radiation, i.e., the center of the diffraction grating 3.

The angle $\beta$ can be determined on the basis of the position x on the image sensor. To determine the angle $\alpha$, the angle $\theta$ is determined by an equation (2) shown below using the wavelength $\lambda$ determined by the manner described below:

$$\sin\theta_0 - \sin\theta = \pm\lambda/d \quad (2)$$

where $\theta_0$ is a known angle between the light beam incident to the diffraction grating 3 and the normal N, d is the grating constant, and n is the order of diffraction which is usually equal to 1. Then, the angle $\alpha$ is determined by using a known angle $\theta_1$ between the diffraction grating 3 and the Z axis ($\alpha = 90° - \theta - \theta_1$).

Assume that the camera 5 is a color camera, adjusting filters 55' and 56' each having a particular spectral transmittance different from each other are respectively attached to the sensors 55 and 56 to provide the sensors 55 and 56 with different effective spectral sensitivities $\sigma_1(\lambda)$ and $\sigma_2(\lambda)$. When the output levels of the sensors 55 and 56 associated with the specific point P are $I_1$ and $I_2$, respectively, the output levels $I_1$ and $I_2$ have a level rate R which is expressed as:

$$R = \frac{I_1}{I_1 + I_2} = \frac{\sigma_1(\lambda)}{\sigma_1(\lambda) + \sigma_2(\lambda)} \quad (3)$$

It is therefore possible to determine the wavelength $\lambda$ by using the level rate R only if the effective spectral sensitivities $\sigma_1(\lambda)$ and $\sigma_2(\lambda)$ are determined such that a function $f(\lambda)$ which is shown below is a monotone function with respect to the wavelength $\lambda$:

$$f(\lambda) = \frac{\sigma_1(\lambda)}{\sigma_1(\lambda) + \sigma_2(\lambda)} \quad (4)$$

$$\lambda = f^{-1}(R) \quad (5)$$

The wavelength $\lambda$ so determined is used to obtain the angle $\alpha$. i.e., used for "$\lambda$" in the equation (2).

Figure 2:
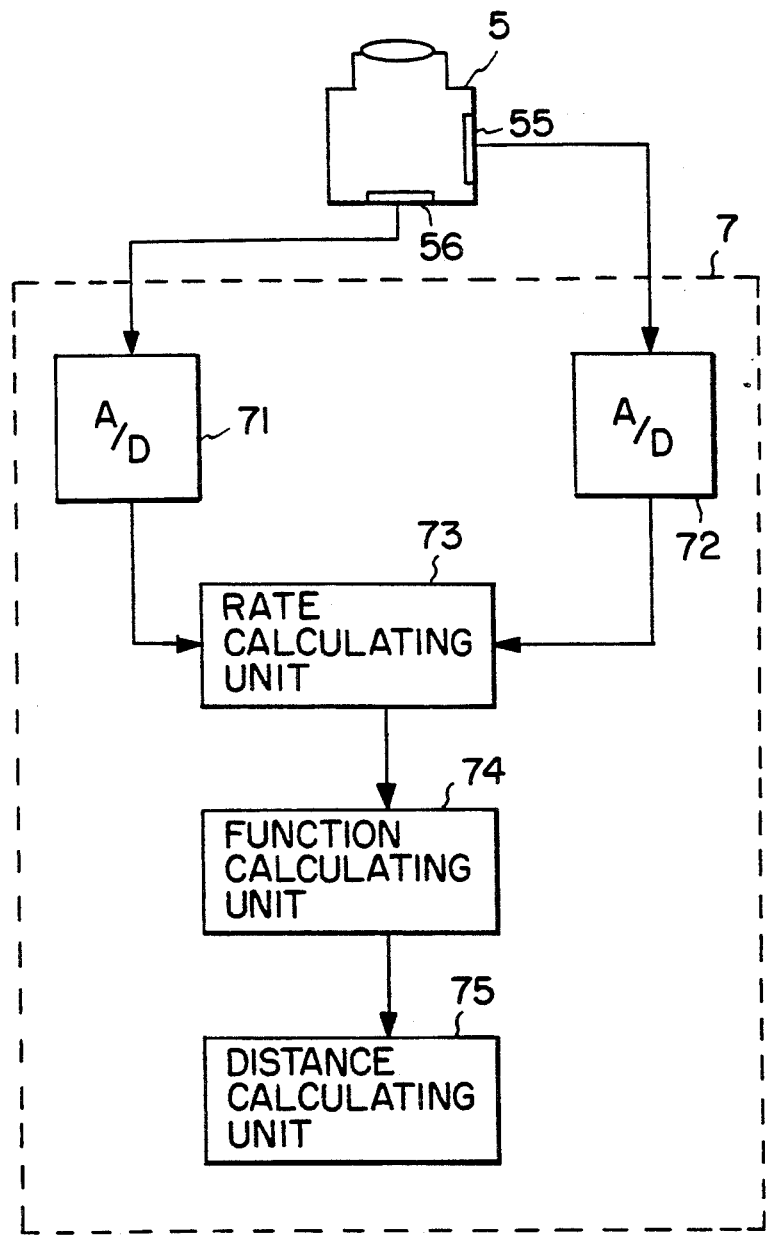
FIG. 2 is a block diagram schematically showing a processing unit included in the conventional range finder.

FIG. 2 schematically shows a processing unit 7 for executing the above-stated procedure. As shown, two picture signals fed from the sensors 55 and 56 to the processing unit 7 are converted to digital signals by analog-to-digital (A/D) converters 71 and 72, respectively. Receiving the resulted outputs of the A/D converters 71 and 72, a rate calculating unit 73 determines the rate R by using the equation (3). A function calculating circuit 74 produces the wavelength $\lambda$ by use of the equation (5). Finally, a distance calculating unit 75 produces distance information by performing the operations shown by the equations (2) and (1). This kind of image processing unit 7 is disclosed in detail in previously stated U.S. Pat. No. 4,864,395.

In principle, the range finder having the above construction is capable of producing distance information with accuracy. The prerequisite in determining the distance accurately is that the level rate R should be obtained accurately from the two picture signals. Since the level rate R is derived from the ratio between the outputs $I_1$ and $I_2$ of the sensors 55 and 56, it is necessary that the sensor outputs $I_1$ and $I_2$ of the sensors since TV cameras or similar image pickup devices suffer from certain noise without exception, the level rate R cannot be determined with accuracy unless the denominator ($I_1 + I_2$) of the equation (3) is sufficiently great.

Figure 3:
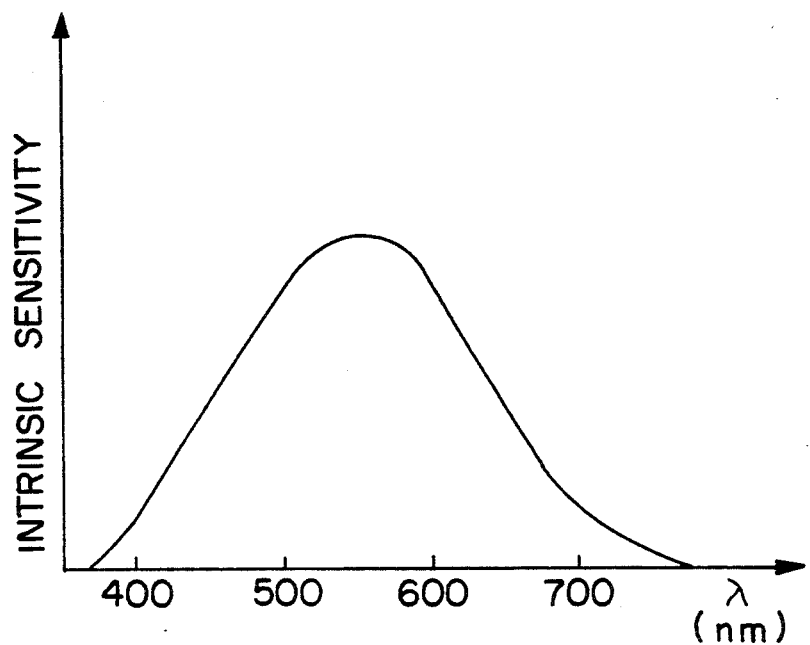
FIG. 3 is a graph indicative of an intrinsic spectral sensitivity of a sensor included in the conventional range finder.
Figure 4:
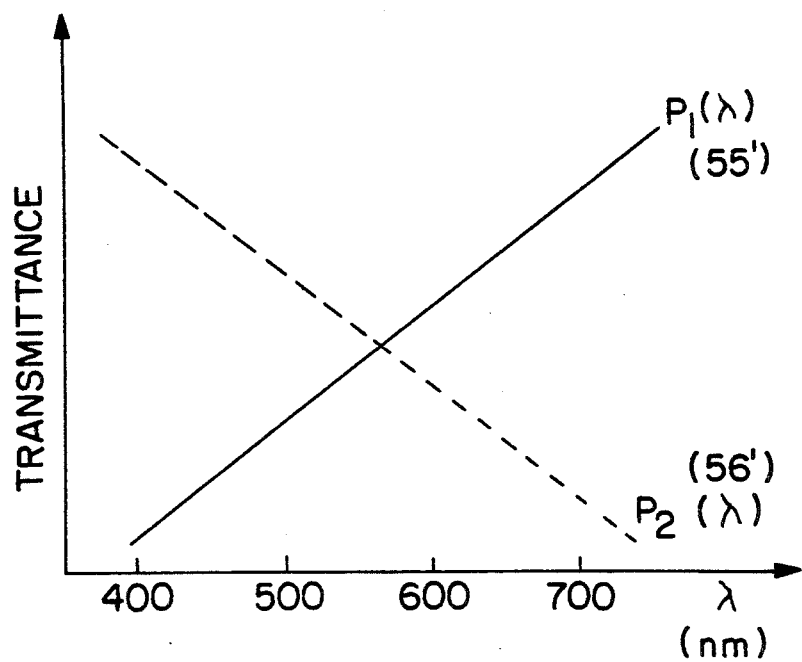
FIG. 4 is a graph representative of spectral transmittances particular to adjusting filters each being mounted on respective one of sensors which are incorporated in the conventional range finder.

As shown in FIG. 3, the CCD image sensors 55 and 56 built in a TV camera (sensors without the filters 55' and 56') each has a intrinsic spectral sensitivity distribution which is approximated to the luminosity of human being. By contrast, as shown in FIG. 4, the adjusting filters 55' and 56' having transmittances $\rho_1(\lambda)$ and $\rho_2(\lambda)$, respectively, reduce the outputs of their associated sensor outputs in a low sensitivity range and thereby lower the accuracy of measurement. The problem with the conventional range finder is, therefore, that the accuracy of measurement is degraded at a point of the object where the illuminating beam, having a wavelength in the low effective sensitivity of the sensors, is incident.

The above problem is also derived from the difference in the color of an object. Specifically, since the spectral intensity of the light beam is modulated by the reflectance of the object, the accuracy in distance is lowered in a portion illuminated by a beam having a wavelength whose reflectance is low.

Preferred embodiments of the distance information obtaining device in accordance with the present invention will be described hereinafter. In the figures, the same components as the components of the conventional range finder are designated by the same reference numerals, and redundant description will be avoided for simplicity.

Figure 5:
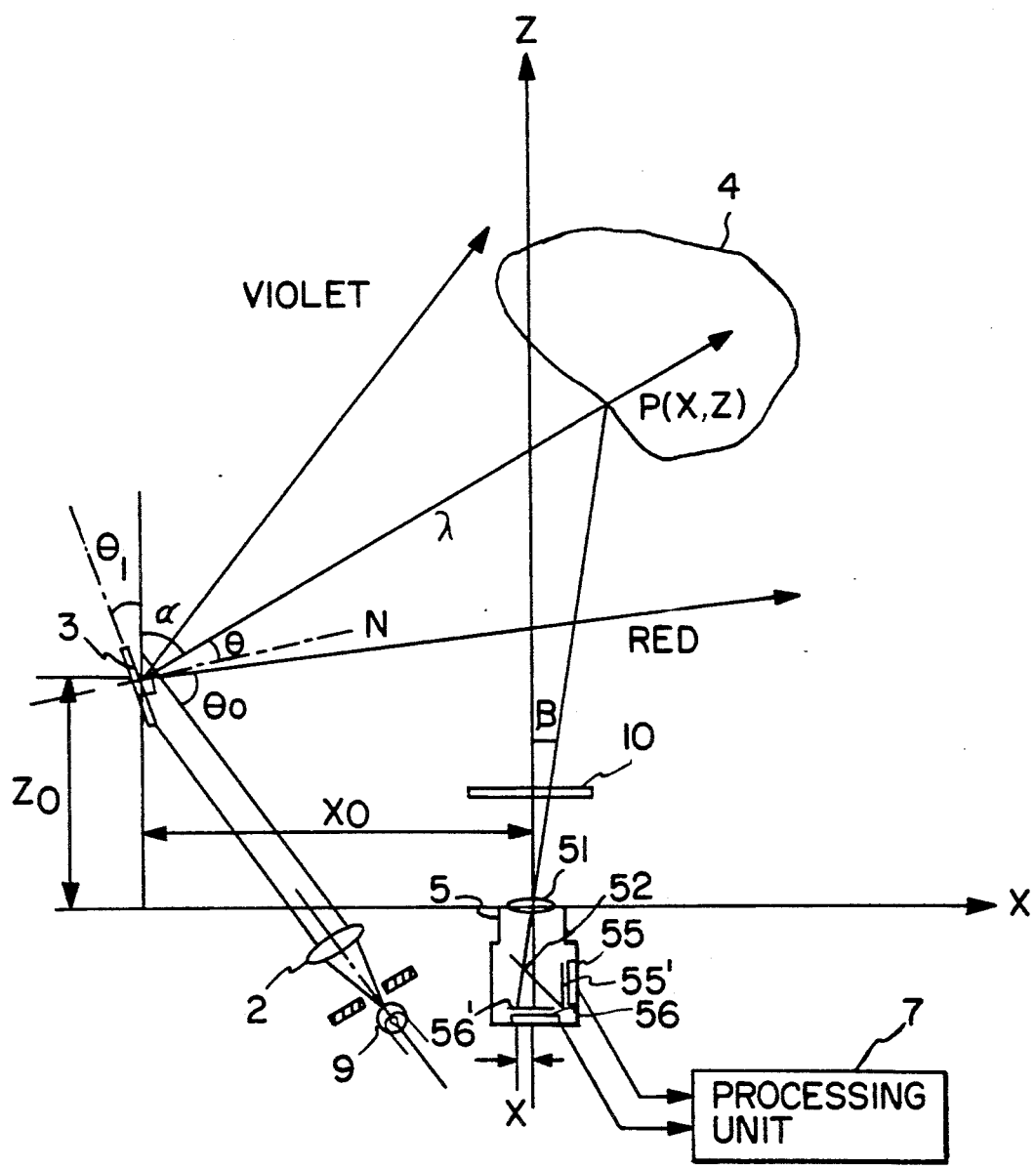
FIG. 5 shows a first embodiment of the distance information obtaining device in accordance with the present invention.

Referring to FIG. 5, a first embodiment of the present invention has a correcting filter 10 located on an optical reflection path which extends from an object 4 to a camera 5. The rest of the construction is essentially the same as the conventional range finder described above.

Figure 6A:
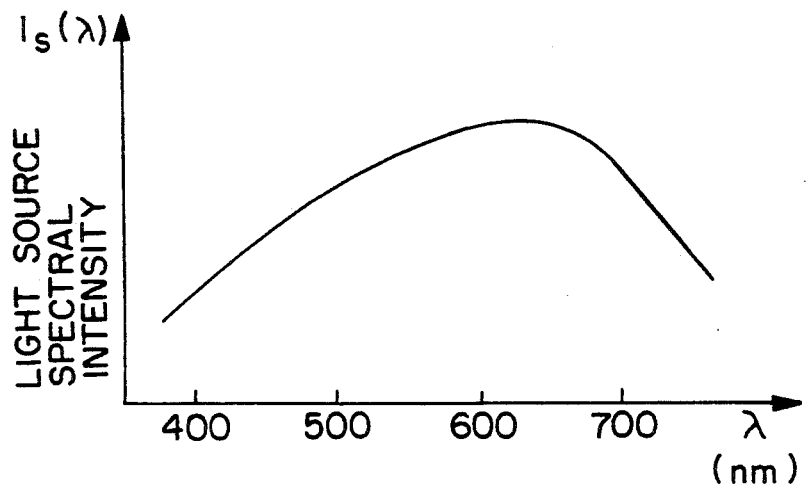
FIGS. 6(a) through 6(c) are graphs showing respectively a spectral intensity of a light source depicted in FIG. 5, an intrinsic spectral sensitivity of a CCD image sensor, and a product of the spectral intensity and intrinsic spectral sensitivity.
Figure 6B:
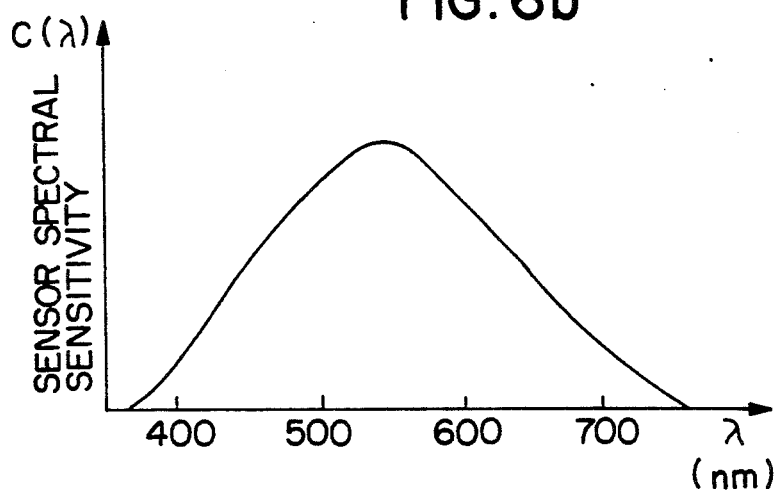
Figure 6C:
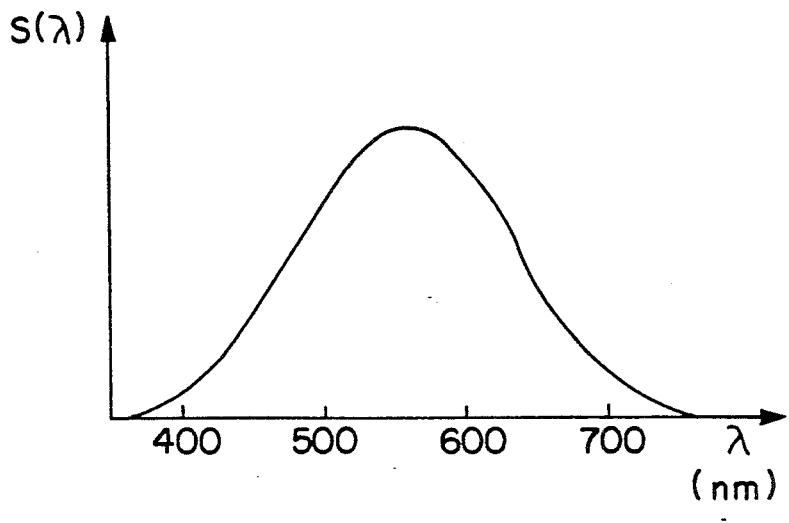

The correcting filter 10 has a spectral transmittance $F_0(\lambda)$ which is selected as follows. Assume that a light source 9 has spectral intensities $I_s(\lambda)$ shown in FIG. 6(a), and that CCD image sensors 55 and 56 (without a filter 55' or 56') each has an intrinsic spectral sensitivities $C(\lambda)$ shown in FIG. 6(b). Then, the product of $I_s(\lambda)$ and $C(\lambda)$ is a function $S(\lambda)$ with respect to the wavelength $\lambda$, as shown in FIG. 6(c). If the function $S(\lambda)$ is maintained constant without regard to the wavelength $\lambda$, the sensitivity of each sensor 55 or 56 also constant without regard to the wavelength $\lambda$. Hence, the spectral transmittance $F_0(\lambda)$ of the filter 10 is selected to satisfy a relation:

$$F_0(\lambda) \propto \frac{1}{S(\lambda)} \quad (6)$$

Figure 7:
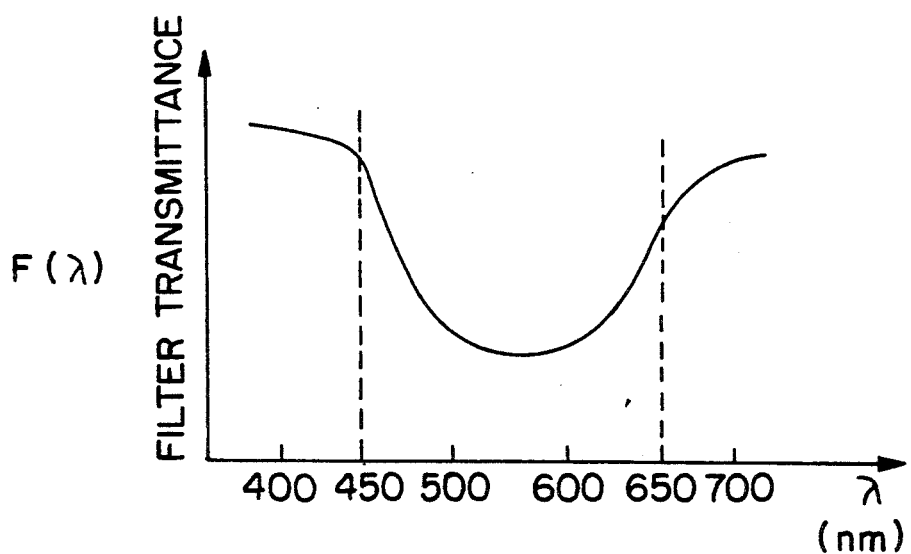
FIG. 7 is a graph representative of the spectral transmittance of a correcting filter shown in FIG. 5.

When the correcting filter 10 having such a spectral transmittance is inserted in the optical path, the quantity of light is corrected to allow the outputs of the sensors 55 and 56 to remain constant without regard to the wavelength $\lambda$. This is successful in promoting accurate distance measurement. FIG. 7 shows a specific filter transmittance for correcting the characteristic shown in FIG. 6(c) over the range of $\lambda = 450$ nanometers to 650 nanometers. Although fabricating such a filter accurately is difficult, approximation will suffice so far as practical use is concerned.

Figure 8:
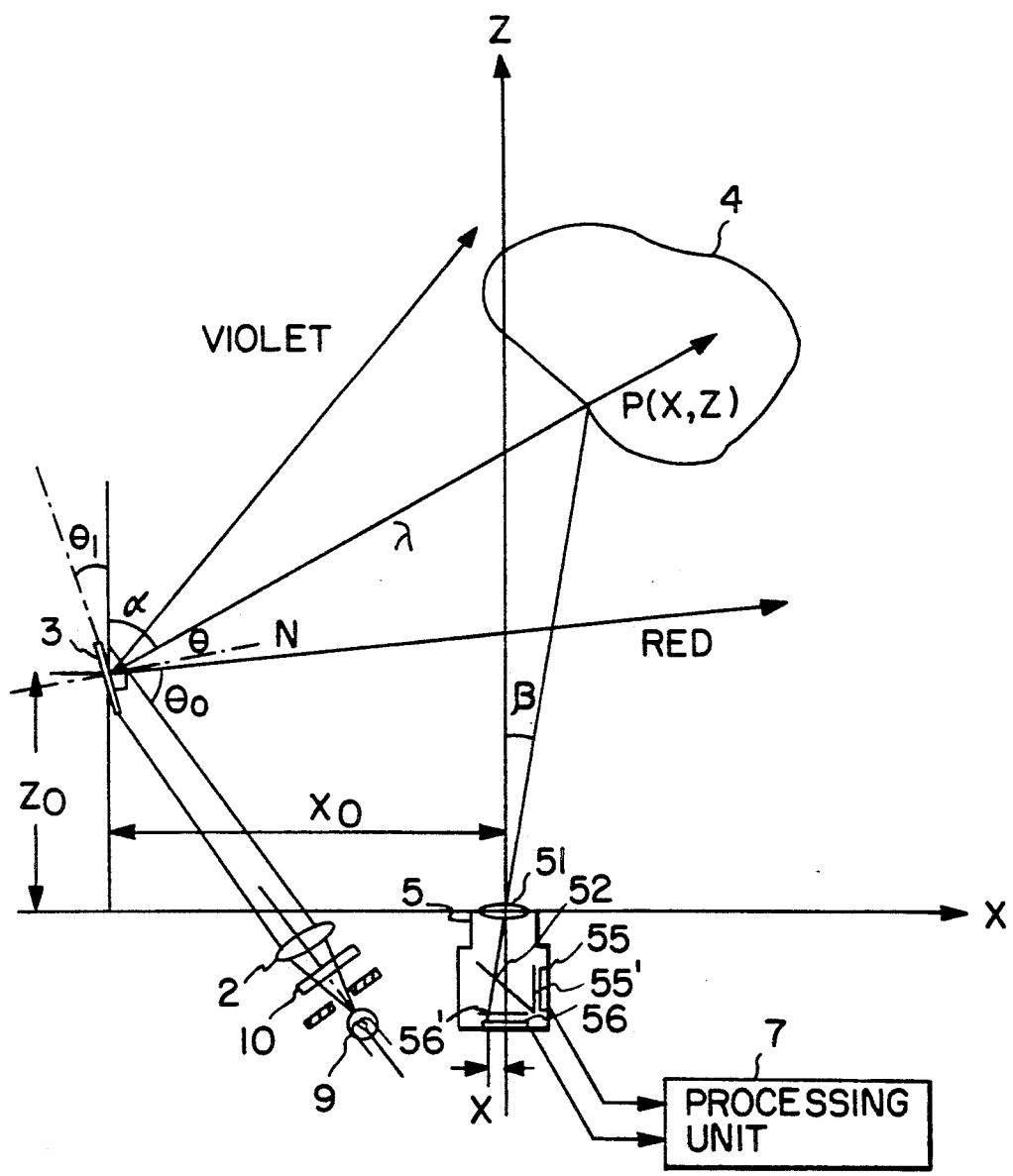
FIG. 8 shows a second embodiment of the present invention.

Referring to FIG. 8, a second embodiment of the present invention will be described. As shown, the correcting filter 10 having the spectral transmittance $F_0(\lambda)$ represented by the formula (6) is disposed between a light source 9 and a lens 2. Regarding the rest of the construction, the second embodiment is identical with the first embodiment. The second embodiment having the filter 10 on the light source 9 side achieves the same advantage as the first embodiment.

Figure 9:
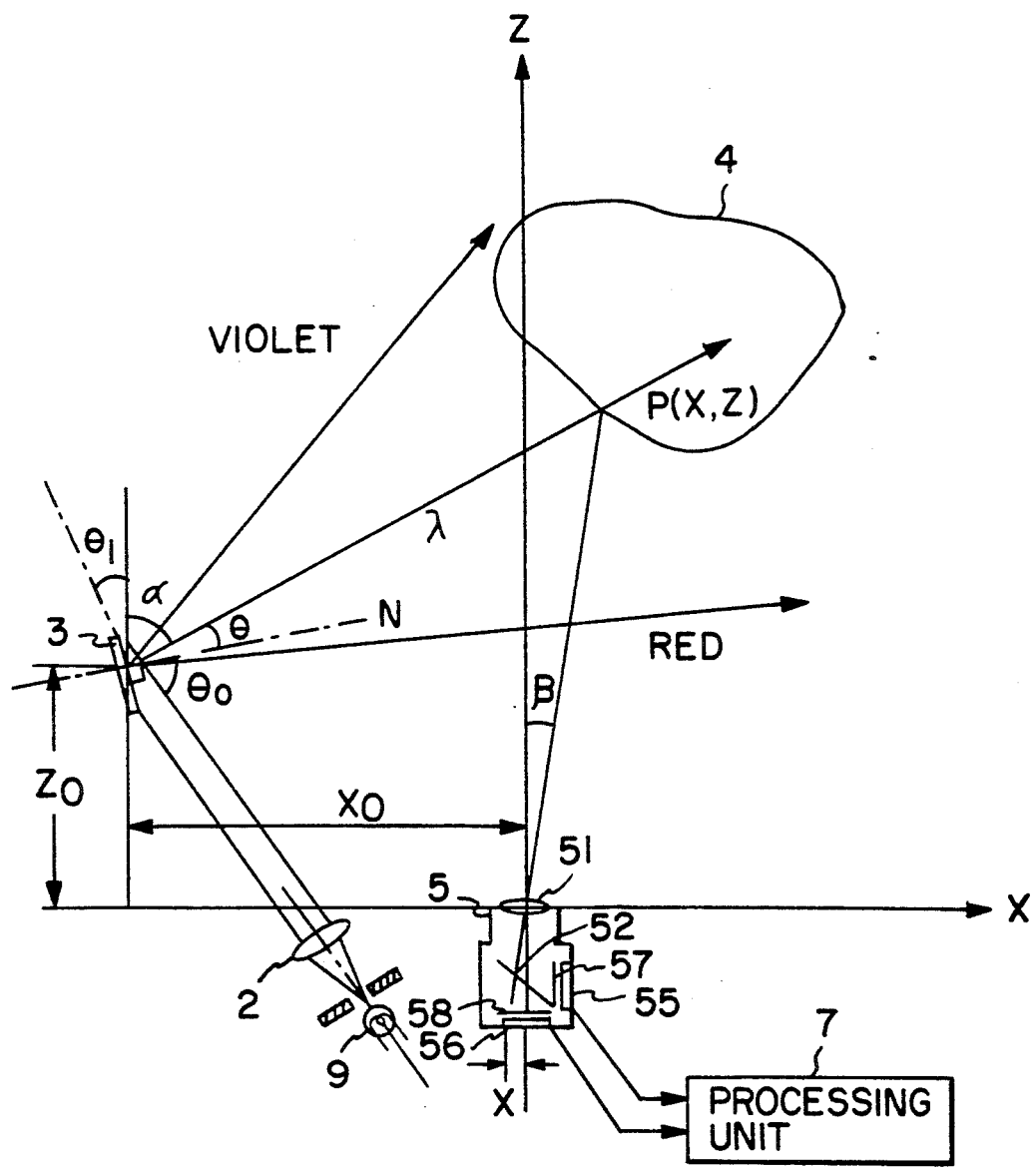
FIG. 9 shows a third embodiment of the present invention.

FIG. 9 shows a third embodiment of the present invention which provides the CCD image sensors 55 and 56 built in the camera 5 with correcting filters 57 and 58, respectively. The spectral transmittance of each of the correcting filters 57 and 58 is changed to attain the advantage described in relation to the first and second embodiments. Specifically, the correcting filters 57 and 58 are provided on the surfaces of the sensors 55 and 56, respectively, and have transmittances $\rho'_1(\lambda) = \rho_1(\lambda)F_0(\lambda)$ and $\rho'_2(\lambda) = \rho_2(\lambda)F_0(\lambda)$, respectively. This embodiment allows the quantity of light to be used effectively in the optimal design of sensor characteristic, thereby suppressing the lightness of the light source and lens adequately.

Figure 10:
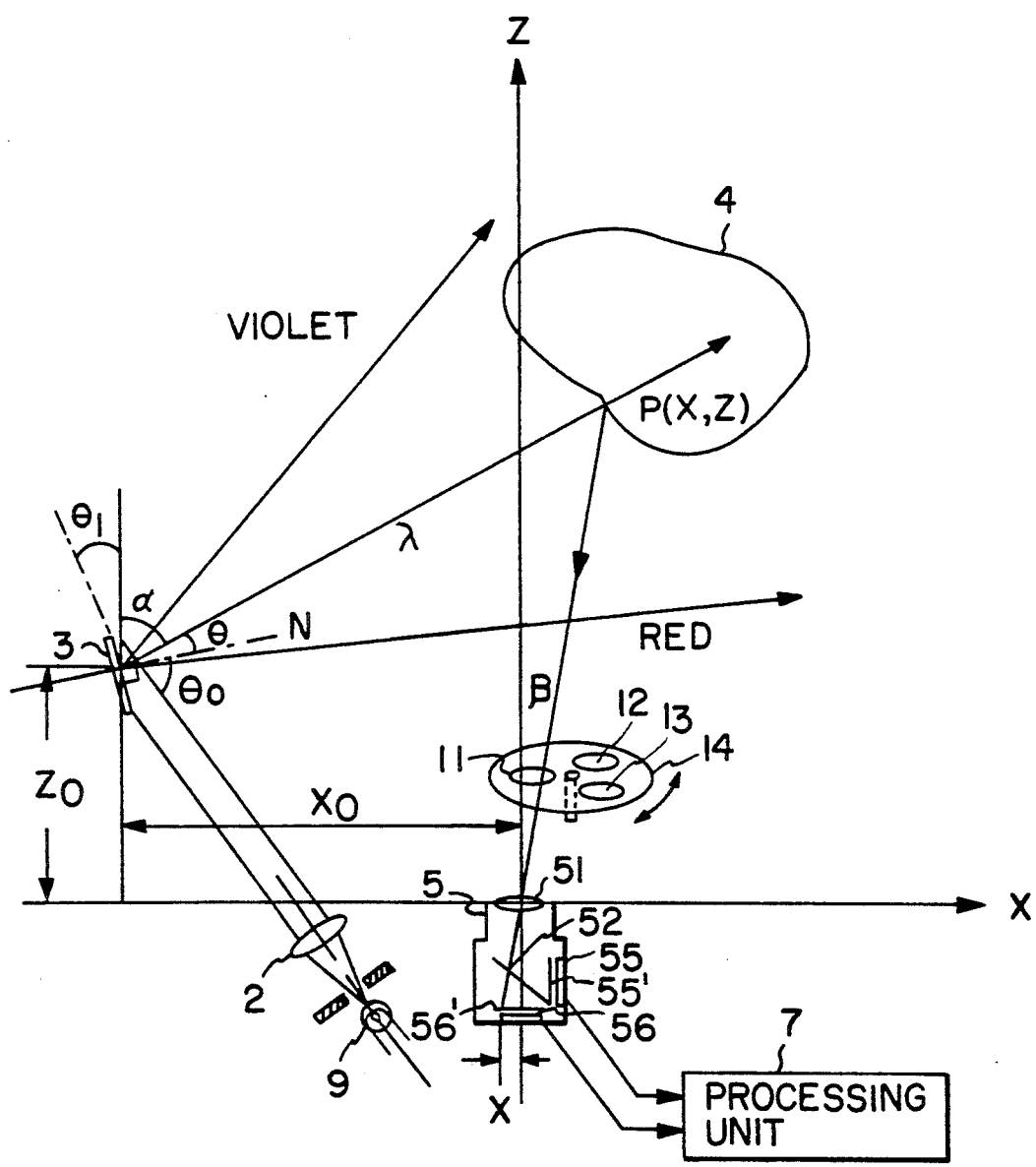
FIG. 10 shows a fourth embodiment of the present invention.

FIG. 10 shows a fourth embodiment of the present invention which compensates even for the influence of the spectral reflectance ascribable to the difference in the color of the object 4. As shown, three kinds of correcting filters 11, 12 and 13 are mounted on a filter changing mechanism 14. The filter changing mechanism 14 is rotatable to locate one of the filters 11, 12 and 13 matching the color of the object 4 on the optical path which extends from the object 4 to the camera 5.

Assuming that the spectral transmittance of the object 4 is $O_i(\lambda)$, and the function described in relation to the formula (6) is $S(\lambda)$, then the spectral transmittance $F_i(\lambda)$ of the correcting filters 11, 12 and 13 is so selected to satisfy a relation:

$$F_i(\lambda) \propto \frac{1}{S(\lambda)O_i(\lambda)} \quad (7)$$

Figure 11:
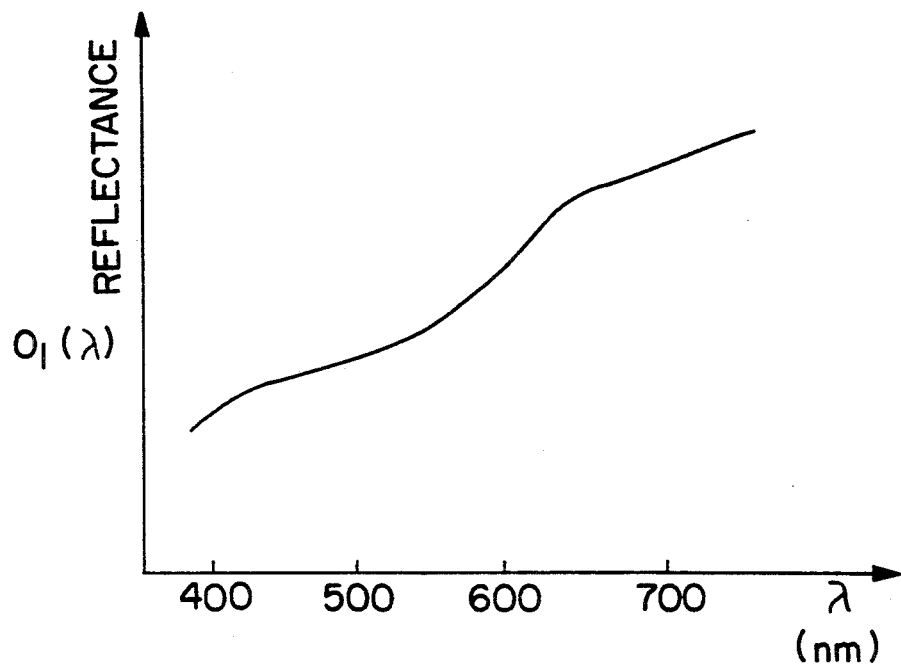
FIG. 11 is a graph indicative of the spectral reflectance of an object shown in FIG. 10.
Figure 12:
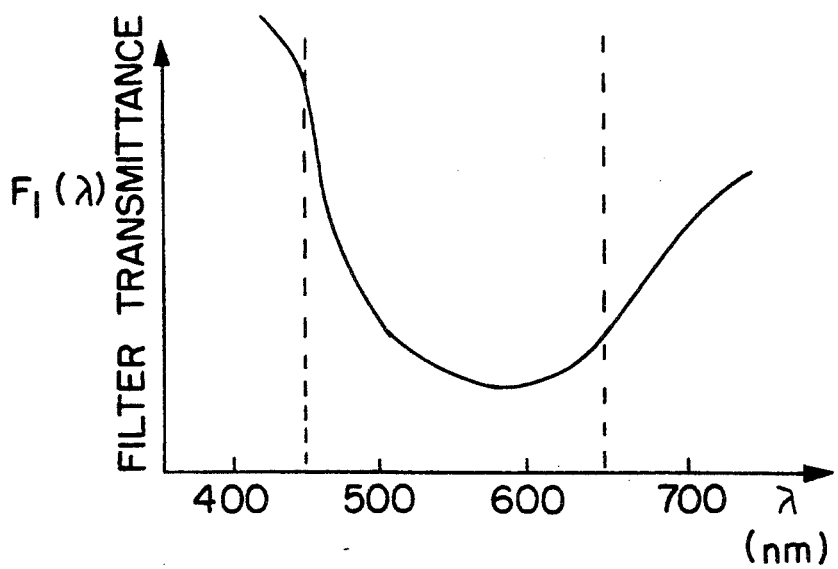
FIG. 12 is a graph showing the spectral transmittance of a correcting filter which is feasible for the measurement of an object having the spectral reflectance shown in FIG. 11.

For example, when the spectral reflectance $O_1(\lambda)$ of the object 4 has a characteristic shown in FIG. 11, the spectral transmittance $F_1(\lambda)$ of the correcting filter 11 is selected to have a distribution shown in FIG. 12. This filter 11 is used to measure an object whose spectral reflectance is $O_1(\lambda)$.

Figure 13:
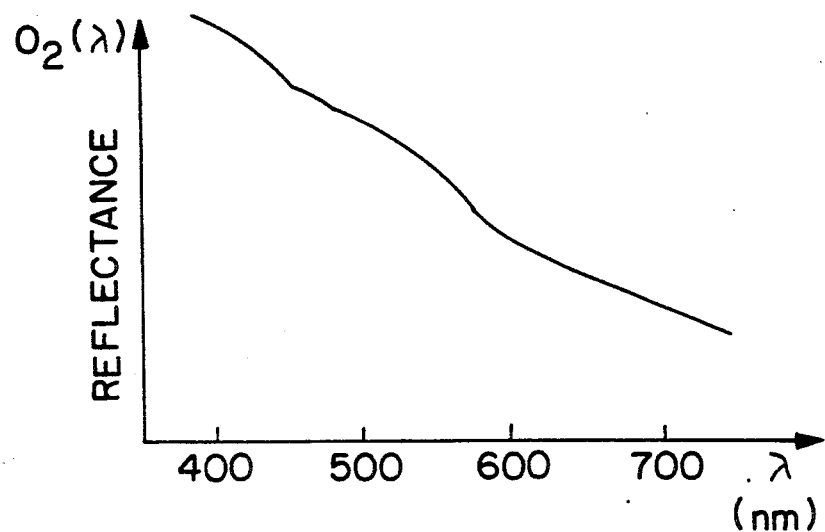
FIG. 13 is a graph showing the spectral reflectance of an object of a color different from the color of the object shown in FIG. 10.
Figure 14:
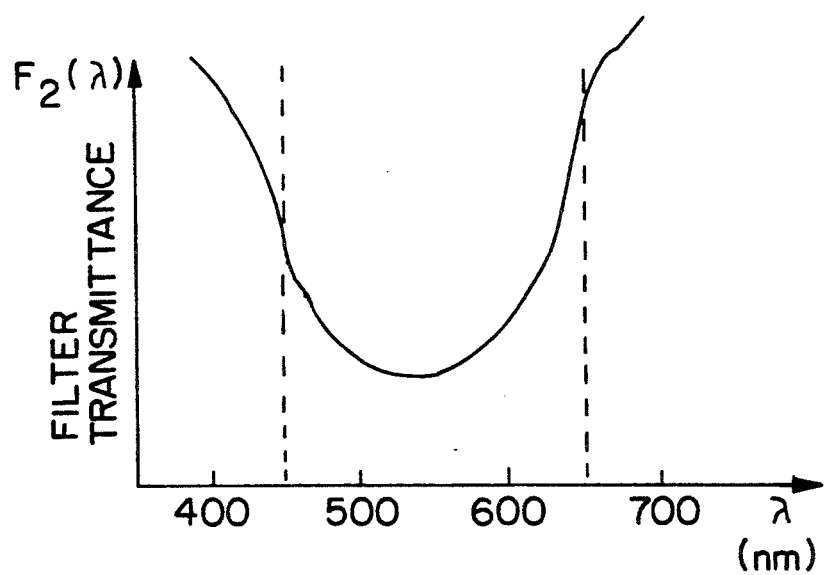
FIG. 14 is a graph showing the spectral transmittance of a correcting filter suitable for the measurement of an object having the spectral reflectance plotted in FIG. 13.

When an object of another color has a spectral reflectance $O_2(\lambda)$ which is distributed as shown in FIG. 13, the spectral transmission $F_2(\lambda)$ of the correcting filter 12 shown in FIG. 14 is selected. Such a filter 12 is used to measure an object whose spectral reflectance is $O_2(\lambda)$.

Likewise, to measure an object of still another color, the spectral transmittance of the correcting filter 13 may be selected in matching relation to the spectral reflectance of the object of interest. If desired, the correcting filter 10 whose spectral transmittance is $F_0(\lambda)$ may be used as the filter 13 so as to measure objects of colors other than the color to which an exclusive correcting filter is assigned.

The filter changing mechanism 14 may be located in front of the light source 9, i.e., on the optical path for illumination.

What is claimed is:

1. A distance information obtaining device comprising:
   spectral pattern projecting means for producing, from a light beam issuing from a light source, an illuminating beam having a plurality of wavelength components and for projecting said illuminating beam onto an object;
   image pickup means for picking up a reflected beam reflected from said object by a plurality of sensor units each having a particular effective spectral sensitivity;
   a correcting filter located on an optical path including said illuminating beam and said reflected beam for correcting a spectral characteristic of said light beam and spectral characteristics of said sensor units; and
   processing means for executing arithmetic operations with a plurality of pictures produced by said plurality of sensor units of said image pickup means to thereby determine a distance from said image pickup means to said object for each pixel of said pictures.

2. A device as claimed in claim 1, wherein said sensor units each comprises:
   a sensor element having an intrinsic spectral sensitivity; and
   an adjusting filter for adjusting said intrinsic spectral sensitivity to thereby provide said sensor unit with said effective spectral sensitivity;
   wherein that a product of a spectral intensity of said light beam and said intrinsic spectral sensitivity is S(λ), and correcting filter has a spectral transmittance F(λ) which is expressed as:

$$F(\lambda) \propto \frac{1}{S(\lambda)}$$

3. A device as claimed in claim 1, wherein said correcting filter is located on an optical path along which said illuminating beam is propagated.

4. A device as claimed in claim 1, wherein said correcting filter is located on an optical path along which said reflected beam is propagated.

5. A device as claimed in claim 1, wherein said processing means determines a wavelength of said wavelength component on the basis of a ratio between quantities of light sensed by said plurality of sensor units.

6. A distance information obtaining device comprising:
spectral pattern projecting means for producing, from a light beam issuing from a light source, an illuminating beam having a plurality of wavelength components and for projecting said illuminating beam onto an object;
image pickup means for picking up a reflected beam reflected from said object by a plurality of sensor units each having a particular effective spectral sensitivity;
a correcting filter located on an optical path including said illuminating beam and said reflected beam for correcting spectral characteristics of said light beam, color of said object, and said sensor unit; and
processing means for executing arithmetic operations with a plurality of pictures produced by said plurality of sensor units of said image pickup means to thereby determine a distance from said image pickup means to said object for each pixel of said pictures.

7. A device as claimed in claim 6, wherein said sensor units each comprises:
a sensor element having an intrinsic spectral sensitivity; and
an adjusting filter for adjusting said intrinsic spectral sensitivity to thereby provide said sensor unit with said effective spectral sensitivity;
wherein a product of a spectral intensity of and said light beam and said intrinsic spectral sensitivity is S(λ), a spectral transmittance of said object is O(λ), said correcting filter has a spectral transmittance F(λ) which is expressed as:

$$F(\lambda) \propto \frac{1}{S(\lambda)O(\lambda)}$$

8. A device as claimed in claim 6, wherein said correcting filter is located on an optical path along which said illuminating beam is propagated.

9. A device as claimed in claim 6, wherein said correcting filter is located on an optical path along which said reflected beam is propagated.

10. A device as claimed in claim 6, wherein said processing means determines a wavelength of said wavelength component on the basis of a ratio between quantities of light sensed by said plurality of sensor units.

11. A device as claimed in claim 6, wherein a plurality of said correcting filters are provided, said device further comprising filter changing means for selecting one of said plurality of filters which matches the color of said object.

* * * * *